United States Patent
Mountcastle, III et al.

(10) Patent No.: US 6,785,581 B2
(45) Date of Patent: Aug. 31, 2004

(54) METHODS AND SYSTEMS FOR FABRICATING COMPONENTS

(76) Inventors: Vernon Benjamin Mountcastle, III, 5 Thornblade Ct., Durham, NC (US) 27712; Michael Joseph Maloney, 122 Mel Oaks Dr., Chapel Hill, NC (US) 27516; Ronald Clifton Roupe, 2335 Cooper Rd., Graham, NC (US) 27253; William Thomas Bowman, 4825 Pleasant Hill Dr., Roanoke, VA (US) 24018

( * ) Notice: Subject to any disclaimer, the term of this patent is extended or adjusted under 35 U.S.C. 154(b) by 0 days.

(21) Appl. No.: 10/139,883

(22) Filed: May 6, 2002

(65) Prior Publication Data

US 2003/0208293 A1 Nov. 6, 2003

(51) Int. Cl.[7] ............................................. G06F 19/00
(52) U.S. Cl. ........................ 700/96; 700/90; 700/117; 345/963; 703/1
(58) Field of Search .......................... 700/90, 96, 111, 700/117, 180, 182; 709/203; 707/10; 703/1, 7; 706/919; 345/964

(56) References Cited

U.S. PATENT DOCUMENTS

| | | | |
|---|---|---|---|
| 5,128,870 A | 7/1992 | Erdman et al. | |
| 5,301,415 A | 4/1994 | Prinz et al. | |
| 5,514,232 A | 5/1996 | Burns | |
| 5,659,976 A | 8/1997 | Klockenkemper et al. | |
| 5,783,006 A | 7/1998 | Klockenkemper et al. | |
| 5,861,083 A | 1/1999 | Klockenkemper et al. | |
| 5,879,489 A | 3/1999 | Burns et al. | |
| 5,943,905 A | 8/1999 | Klockenkemper et al. | |
| 5,976,339 A | 11/1999 | André, Sr. | |
| 6,099,598 A | 8/2000 | Yokoyama et al. | |
| 6,110,213 A | 8/2000 | Vinciarelli et al. | |
| 6,161,361 A | 12/2000 | Ehrenkrantz | |
| 6,272,447 B1 | 8/2001 | Gavin et al. | |
| 6,372,178 B1 | 4/2002 | Tseng | |

*Primary Examiner*—Jayprakash N. Gandhi
(74) *Attorney, Agent, or Firm*—Karl A. Vick, Esq.; Armstrong Teasdale LLP

(57) ABSTRACT

A method for fabricating at least one component using a server system is provided. The server system is coupled to a centralized database and at least one client system. The method includes receiving fabrication data for at least one component from a client system, receiving a component order from a client system, storing fabrication data and component order data in the centralized database, creating routing operations for fabricating each ordered component, creating Numerical Control (NC) code for fabricating each ordered component, and fabricating each ordered component.

43 Claims, 14 Drawing Sheets

FIG. 11

| | | | | | | | | | | | | | |
|---|---|---|---|---|---|---|---|---|---|---|---|---|---|

MANUFACTURING INSTRUCTIONS — MEBANE.NC

Part Number: 110C1185P5

Printed: 20-Feb-2002 7:48
Page: 1
Date: 02/16/02
MWD 02/16/02

Part Order: H20021060417

Quantity 3
SPECIAL

| DL No | Used On MP | Rev | Dest DZ | | Penalty | | Order Code | | Start Date 02/16/02 | | MW Date 02/16/02 | |
|---|---|---|---|---|---|---|---|---|---|---|---|---|
| Oper. No. | 01 | 02 | 03 | 04 | 05 | 06 | 07 | 08 | 09 | 10 | 11 | 12 | 13 |
| Work Sta. | SS01 | SP14 | SB06 | SP37 | | | | | | | | | |

Note:

B8A3A    HOT ROLL STEEL              05.40    5 SU OP PAY NO QTY  IN
MT- .090 SM- 14.75 LG- 34.57    OPER    0.67    2                      01
                                MISC                                   02
OP 01   WS SS01 QTY 000003 TOTAL           7                           03
14.75
34.57
IDENTIFY 0D03 PARTS C1185P5    ON LONG SIDE-FRONT
*********************************************************************

620

| TEAM ID | EMP BADGE NUMBER | EMP NAME | WORK STATION AREA | WORK STATION ID | PART ORDER NUMBER | ASSEMBLY/PART NUMBER |
|---|---|---|---|---|---|---|
| FT1 | 25043 | John P | high vol | SP51 | H20021953304 | 272A5650WL/P1 |
| | | | PUNCH | SP10 | P20021182169 | 68.J122226CV0000AAN |
| | | | PUNCH | SP10 | P20021183791 | 68.J122226CV0000AAN |
| | | | PUNCH | SP10 | P20021183988 | 208C4326P1 |
| | | | PUNCH | SP10 | P20021184164 | 190B101CP3 |
| | | | PUNCH | SP10 | H20021056668 | 56C885934P1 |
| | | | PUNCH | SP10 | H20021059744 | 100B1201P1 |
| | | | PUNCH | SP10 | P20021183964 | 100B2331P1 |
| | | | PUNCH | SP10 | P20021179831 | 68J12220PDF0000AAB |
| | | | PUNCH | SP10 | P20021165128 | 273A7728GAP3 |
| | | | PUNCH | SP10 | P20021161866 | 68J122091MF0000AAN |
| | | | PUNCH | SP10 | P20021162492 | 1008689482 |
| | | | PUNCH | SP10 | P20021180192 | 68.J122091MF0000AAN |
| | | | PUNCH | SP10 | P20021182635 | 75B514175P116 |
| | | | PUNCH | SP10 | P200211B4314 | 75B514175P116 |
| | | | PUNCH | OP10 | NB2002GEDAA | NEST |
| | | | PUNCH | SP10 | P20021180360 | 204B4153CPG3 |
| | | | PUNCH | SP10 | P20021183084 | 116C6681P33 |
| | | | PUNCH | SP10 | P20021182473 | 58J110390AA26200XE |
| | | | PUNCH | SP10 | P20021183763 | 68J122200CB0003AAN |
| | | | PUNCH | SP10 | P20021164641 | 56C882293P2 |
| | | | PUNCH | SP10 | P20021135213 | 68J122228RQ000AAY |
| | | | PUNCH | SP10 | P20021180194 | 68J122208C8000CAAN |
| | | | PUNCH | OP10 | NB2002GEDAA | NEST |
| | | | PUNCH | OP10 | HR2002GEDAA | NEST |
| | | | PUNCH | SP10 | P200211B1382 | 6BJ110506AX22XXXB |
| | | | PUNCH | SP10 | P200211B3339 | 5BCE85934P1 |
| | | | PUNCH | SP10 | P200211B1678 | 55C685003P2 |
| | | | PUNCH | SP10 | P200211B1679 | 65C685903P2 |
| | | | PUNCH | SP10 | P200211B4192 | 273A7728GAP3 |
| | | | PUNCH | SP10 | P200211B3805 | 68J122210TQ0000AAN |
| | | | PUNCH | SP10 | P20021163353 | 68J110500AX22XXXB |
| | | | PUNCH | OP10 | NB2002GEDAA | NEST |
| | | | PUNCH | OP10 | NB2002GEDAA | NEST |
| | | | PUNCH | OP10 | NB2002GEDAA | NEST |
| | | | PUNCH | OP10 | NB2002GEDAA | NEST |
| | | | PUNCH | OP10 | NB2002GEDAA | NEST |
| | | | PUNCH | OP10 | NB2002GEDAA | NEST |
| | | | PUNCH | OP10 | NB2002GEDAA | NEST |
| | | | PUNCH | OP10 | NB2002GEDAA | NEST |
| | | | PUNCH | OP10 | NB2002GEDAA | NEST |
| | | | PUNCH | OP10 | NB2002GEDAA | NEST |

| SETUP TIME | RUNTIME PER PART | QUANTITY | RUN TIME | ACTUALS | EFFICIENCY | COMPLETED DATE | MW DATE | DAY DIFF | PLAN TYPE |
|---|---|---|---|---|---|---|---|---|---|
| 12 | 0.128 | 1200 | 150 | | | 2/15/02 | 2/15/02 | 0 | PRM |
| 3 | 0.3 | 1 | 0.3 | | | 2/11/02 | 2/20/02 | 9 | SMS |
| 3 | 0.4 | 1 | 0.4 | | | 2/14/02 | 2/20/02 | 8 | SMS |
| 3 | 0.47 | 1 | 0.47 | | | 2/14/02 | 2/14/02 | 0 | PRM |
| 3 | 0.12 | 4 | 0.48 | | | 2/14/02 | 2/14/02 | -3 | PRM |
| 3 | 0.495 | 1 | 0.5 | | | 2/12/02 | 2/12/02 | 0 | PRM |
| 3 | 0.15 | 4 | 0.5 | | | 2/11/02 | 2/11/02 | 0 | PRM |
| 3 | 0.18 | 3 | 0.6 | | | 2/11/02 | 2/14/02 | 0 | PRM |
| 3 | 0.25 | 2 | 0.72 | | | 2/11/02 | 2/11/02 | 3 | SMS |
| 3 | 0.42 | 1 | 0.75 | | | 2/15/02 | 2/15/02 | -2 | PRM |
| 3 | 0.98 | 2 | 0.84 | | | 2/14/02 | 2/14/02 | 1 | SMS |
| 3 | 0.54 | 2 | 0.88 | | | 2/14/02 | 2/14/02 | 5 | PRM |
| 3 | 0.552 | 2 | 1.08 | | | 2/11/02 | 2/11/02 | 3 | SMS |
| 3 | 0.552 | 1 | 1.1 | | | 2/12/02 | 2/15/02 | 3 | PRM |
| 3 | 1.24 | 1 | 1.1 | | | 2/14/02 | 2/15/02 | 4 | PRM |
| 3 | 1.4 | 2 | 1.24 | | | 2/15/02 | 2/15/02 | 4 | NEST |
| 3 | 0.71 | 3 | 1.4 | | | 2/11/02 | 2/15/02 | 2 | PRM |
| 3 | 0.506 | 3 | 1.42 | | | 2/14/02 | 2/15/02 | 7 | PRM |
| 3 | 0.532 | 3 | 1.52 | | | 2/14/02 | 2/15/02 | 6 | PRM |
| 3 | 0.567 | 4 | 1.6 | | | 2/14/02 | 2/15/02 | 6 | PRM |
| 3 | 0.501 | 4 | 1.7 | | | 2/15/02 | 2/15/02 | -6 | PRM |
| 3 | 0.532 | 1 | 2 | | | 2/15/02 | 2/15/02 | 11 | PRM |
| 3 | 0.248 | 1 | 2.13 | | | 2/11/02 | 2/20/02 | 3 | PRM |
| 3 | 2.52 | 5 | 2.48 | | | 2/15/02 | 2/7/02 | 5 | NEST |
| 3 | 0.521 | 6 | 2.52 | | | 2/11/02 | 2/26/02 | 0 | NEST |
| 3 | 0.495 | 6 | 2.61 | | | 2/14/02 | 2/14/02 | 1 | PRM |
| 3 | 0.6 | 6 | 2.97 | | | 2/14/02 | 2/20/02 | 1 | PRM |
| 3 | 0.5 | 13 | 3 | | | 2/11/02 | 2/20/02 | 9 | PRM |
| 3 | 0.28 | 6 | 3 | | | 2/11/02 | 2/31/02 | 9 | PRM |
| 3 | 0.581 | 7 | 3.49 | | | 2/15/02 | 2/15/02 | -15 | PRM |
| 3 | 0.521 | 1 | 3.85 | | | 2/14/02 | 2/15/02 | 1 | PRM |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |
| 3 | 3.7 | 1 | 3.7 | | | 2/15/02 | 2/15/02 | 0 | NEST |

METHODS AND SYSTEMS FOR FABRICATING COMPONENTS

BACKGROUND OF THE INVENTION

This invention relates generally to fabricating machine parts and, more particularly, to network-based methods and systems for fabricating components.

Entities that are in the business of fabricating a variety of machine parts typically utilize mechanical drawings in the fabrication of each part. The mechanical drawings describe each part in detail, and may illustrate, for example, the overall dimensions of each part, hole locations, notch locations, bend locations, and corresponding dimensions for each hole, notch and bend. A fabricator may utilize the mechanical drawings to superimpose or lay out each part on a sheet of metal used in the fabrication of each part. In at least some known applications, after laying the parts out, each fabricating machine is then programmed to cut, punch, notch, and bend the material to the proper specifications for the component being fabricated. The fabricator must perform these steps for each part, and as such the fabricator must continuously repeat the steps for each part to be fabricated. Accordingly, the fabricating machines are continuously programmed and reprogrammed with the different fabricating programs for each part.

Continuously repeating the lay out of each part to be fabricated, and continuously programming and reprogramming the fabricating machines that fabricate each part may be quite time consuming, and, as a result, may be very costly. Moreover, such repetition may also result in variations in each part fabricated. Additionally, because the emphasis is on producing components, such systems typically do not optimize the fabrication of these parts by combining certain parts to be fabricated on a single piece of raw material such that scrap material is reduced.

BRIEF DESCRIPTION OF THE INVENTION

In one aspect, a method for fabricating at least one component using a server system is provided. The server system is coupled to a centralized database and at least one client system. The method includes receiving fabrication data for at least one component from a client system, receiving a component order from a client system, storing fabrication data and component order data in the centralized database, creating routing operations for fabricating each ordered component, creating Numerical Control (NC) code for fabricating each ordered component, and fabricating each ordered component.

In another aspect, a network based system for fabricating at least one component is provided. The system includes a client system, a centralized database for storing information, and a server system. The server system is configured to be coupled to the client system and the database. The server system is further configured to receive fabrication data for at least one component from a client system, receive a component order from a client system, store fabrication data and the component order in the centralized database, create routing operations for fabricating each ordered component, create Numerical Control (NC) code for fabricating each ordered component, and fabricate each ordered component.

In another aspect, a computer program embodied on a computer readable medium for fabricating at least one component is provided. The program includes a code segment that receives fabrication data and then receives a component order from a client system, stores fabrication data and component order data in a centralized database, creates routing operations for fabricating each ordered component, creates Numerical Control (NC) code for fabricating each ordered component, transmits routing operations and NC code to at least one NC machine for fabricating each ordered component, and tracks the fabrication of each ordered component.

BRIEF DESCRIPTION OF THE DRAWINGS

FIG. 11 is an example embodiment of a user interface displaying Manufacturing Instructions and a Bar Code for a specific component to be fabricated within a FCCS.

FIGS. 13A and 13B illustrate an example embodiment of an Operator Efficiency Report page within a FCCS.

DETAILED DESCRIPTION OF THE INVENTION

Figure 1:
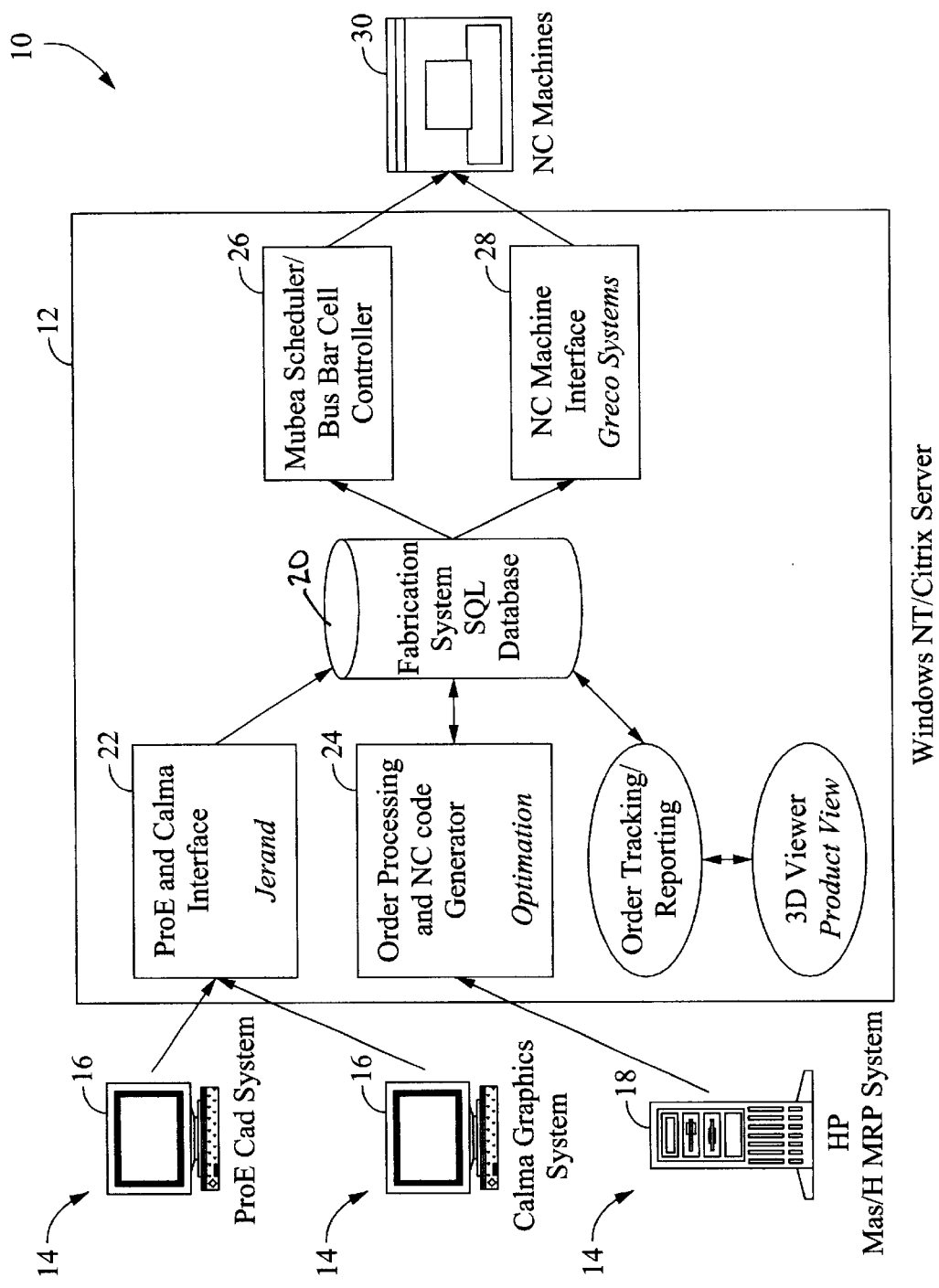
FIG. 1 is a block diagram of a Fabricating Components Coordination System (FCCS) in accordance with one embodiment of the present invention.

Example embodiments of systems and processes that facilitate integrated network-based component fabrication, electronic reporting, and workflow process management related to a Fabricating Components Coordination System (FCCS) are described below in detail. A technical effect produced by the systems and processes include, for example, facilitating the fabrication of components or parts, electronic submission of data using a remote system, automated conversion of data from a graphical format to a sheet metal (SPP) format and then to a Numerical Control (NC) code format, electronic submission of a component order, processing a component order to optimize fabrication, and network-based reporting for internal and external system users. The FCCS permits a user to fabricate components, also referred to sometimes herein as parts, using a network-based system that facilitates and optimizes the fabrication of each component, and the tracking and reporting of the productivity of each employee involved in the fabrication process.

In the example embodiment, the FCCS is utilized to convert fabrication data in a graphical format to a sheet metal format (SPP), store the sheet metal formatted fabrication data in a database, receive an order of components from a user, optimize the fabrication of the ordered components by evaluating the sheet metal formatted fabrication data and the specific machines needed to fabricate each component, create routing operations based on the optimization process, create a Numerical Control code for fabricating each component, and print manufacturing instructions for each component such that each component may then be fabricated by at least one machine as set forth in the routing operations. Fabrication data includes for each component at least one of material specifications, component overall dimensions, hole locations and dimensions, notch locations and dimensions, bend locations and dimensions, and tooling parameters. Fabrication data enables a user to fabricate a particular component. In addition, the FCCS enables a user to track and report productivity of each employee with respect to the fabrication of each component.

In the FCCS, a remote system utilizes a known and commercially available computer aided design (CAD) computer program to design a component to be fabricated. The remote system generates fabrication data for a specific component in a graphical format. The remote system is in communication with a server system that utilizes a combination of a known and commercially available computer program and a custom written program to convert the fabrication data from a graphical format to a sheet metal (SPP) format, which is then stored in a database that is in communication with the server system. Also in communication with the server system is another remote system referred to as a Material Requirement Planning (MRP) computer system. The MRP computer receives an order of components from a user. The MRP computer interfaces with the server system through a processor that optimizes the fabrication of the ordered components by evaluating the fabrication data and the specific machines needed to fabricate each ordered component. The processor then creates routing operations based on the optimization process and creates an NC code for fabricating each ordered component. The routing operations and the NC code are stored in the database. The FCCS then prints manufacturing instructions and a bar code for each ordered component. A user then accesses a component order through a Part Order Production utility, scans the bar code assigned to a specific component from the manufacturing instructions, and downloads the NC code for the component from the FCCS to a specific NC machine such that the component may be fabricated. In addition, the FCCS enables a user to track and report productivity of each employee with respect to the fabrication of each component.

In one embodiment, a computer program is provided, and the program is embodied on a computer readable medium and utilizes a Structured Query Language (SQL) with a client user interface front-end for administration and a web interface for standard user input and reports. In an example embodiment, the system is web enabled and is run on a business-entity intranet. In yet another embodiment, the system is fully accessed by individuals having an authorized access outside the firewall of the business-entity through the Internet. In a further example embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. Rather, components of each system and each process can be practiced independent and separate from other components and processes described herein. Each component and process also can be used in combination with other assembly packages and processes.

FIG. 1 is a block diagram of a Fabricating Components Coordination System (FCCS) 10 including a server system 12, and a plurality of remote sub-systems, also referred to as remote systems 14, connected to server system 12. In one embodiment, remote systems 14 include at least one computer aided design (CAD) computer 16 that includes a known and commercially available CAD computer program. For example, CAD computer 16 may include a Pro/Engineer® or Pro/E CAD System from Parametric Technology Corporation, Needham, Mass. (Pro/Engineer is a registered trademark of Parametric Technology Corporation, Needham, Mass.) or a Calma® Graphics System from Calma Company, Santa Clara, Calif. (Calma is a registered trademark of Calma Company, Santa Clara, Calif.). In addition, remote systems 14 include at least one Material Requirement Planning (MRP) computer 18, which in the example embodiment is an HP® Mas/H MRP System 18 (HP is a registered trademark of Hewlett-Packard Company, Palo Alto, Calif.). CAD computer 16 and MRP computer 18 are in communication with server system 12.

CAD computers 16 and MRP computer 18 are interconnected through many interfaces including a network, such as a local area network (LAN) or a wide area network (WAN), dial-in-connections, cable modems and special high-speed ISDN lines. The methods and systems described herein are not limited to practice with any particular CAD program or any particular MRP system. The methods and systems described herein can be practices with most commercially available CAD program and MRP systems.

In the example embodiment, server system 12 is a Windows® NT/Citrix® Server that includes a database 20 that contains information on a variety of matters, as described below in greater detail (Windows is a registered trademark of Microsoft Corporation, Redmond, Wash.; and Citrix is a registered trademark of Citrix Systems, Inc., Ft. Lauderdale, Fla.). In the example embodiment, database 20 is an SQL database. In an alternative embodiment, a database server (not shown in FIG. 1) is connected to database 20 and is in communication with server system 12 such that information stored in database 20 may be accessed through remote systems 14.

Server system 12 also includes an interface 22 that communicates with CAD computers 16 and database 20. In the example embodiment, interface 22 includes a known and commercially available computer software, for example, interface 22 may include computer software sold by Jerand Technical Service, Inc., Indianapolis, Ind., that converts fabrication data in graphical format from CAD computers 16 to a sheet metal (SPP) format which is then stored in database 20. Server system 12 also includes a processor 24 that communicates with MRP computer 18 and database 20. Processor 24 enables server system 12 to track a specific component order and report an operator production efficiency.

Server system 12 also includes a scheduler/controller 26 and an NC Machine interface 28 that are in communication with database 20 and NC machines 30. In the example embodiment, scheduler/controller 26 is a custom written Mubea Scheduler and Bus Bar Cell Controller software that interfaces with Mubea Bus Bar machines (the Mubea Machines are manufactured by Mubea Murh und Bender Maschinebah GmbH, Attendorn, Germany). In the example embodiment, scheduler/controller 26 is utilized for processing Bus Bar on the automated Mubea machines. Scheduler/controller 26 nests components, which means compactly positions the lay-out of components, on a length of raw copper, aluminum, or other piece of raw material to improve material utilization, and creates a Numerical Control (NC) file for the nested components. An OptiPunch™ and an OptiShear™ software are used to nest multiple components on raw steel sheet metal sheets or other piece of raw material to improve material utilization, and creates a Numerical Control (NC) file for nested components. OptiPunch™ and OptiShear™ are commercially available systems manufactured by Optimation Inc., 300 North Osage, Independence, Mo. 64050. A user then accesses NC Machine interface 28, which enables the user to download the NC file to NC machines 30 so that the components or parts can be fabricated. In the example embodiment, NC Machine interface 28, which includes a WinDNC™, is a known and commercially available system manufactured by Greco Systems, El Cajon, Calif. (WinDNC is a trademark of Greco Systems, El Cajon, Calif.). WinDNC communicates to each machine controller using a communication protocol specific to the individual controller.

In the example embodiment, a component or part to be fabricated is designed on CAD computer 16, which generates fabrication data for a specific component in a graphical format. CAD computer 16 is in communication with server system 12 through interface 22, which converts the fabrication data from a graphical format to a sheet metal format, also known as SPP format. The fabrication data in sheet metal format is then stored in database 20 in server system 12. Also in communication with server system 12 is MRP computer 18. MRP computer 18 receives an order of components from a user. MRP computer 18 communicates with server system 12 through processor 24. Processor 24 optimizes the fabrication of the ordered components by evaluating the fabrication data and the specific machines needed to fabricate each ordered component, also referred to as the "optimation" process. Processor 24 then creates routing operations based on the optimization process and creates a Numerical Control (NC) code for fabricating each ordered component. The routing operations and the NC code are then stored in database 20. FCCS 10 then prints manufacturing instructions and a bar code for each ordered component.

Server system 12 utilizes scheduler/controller 26 to nest components on a length of raw copper, aluminum, or other raw material to improve material utilization, and creates NC code for the nested components. A user then accesses a component order through NC Machine interface 28, scans the bar code assigned to a specific component or nested components from the manufacturing instructions, and downloads the NC code for the components to NC machine 30 so that the components may be fabricated. NC machines 30 include at least one of a Shear Machine, a Turret Machine, a Punch Press Machine, a Brake Machine, a Drill & Tap Machine, a Weld Machine, and a Paint/Plate Machine.

In addition, FCCS 10 enables a user to track and report productivity of each employee with respect to the fabrication of each component, and enables a user to view each component via a 3D viewer prior to fabrication.

Again, the methods and systems described above are not limited to practice to the computer program listed above. The methods and systems can be practiced with a plurality of similar computer programs.

Figure 2:
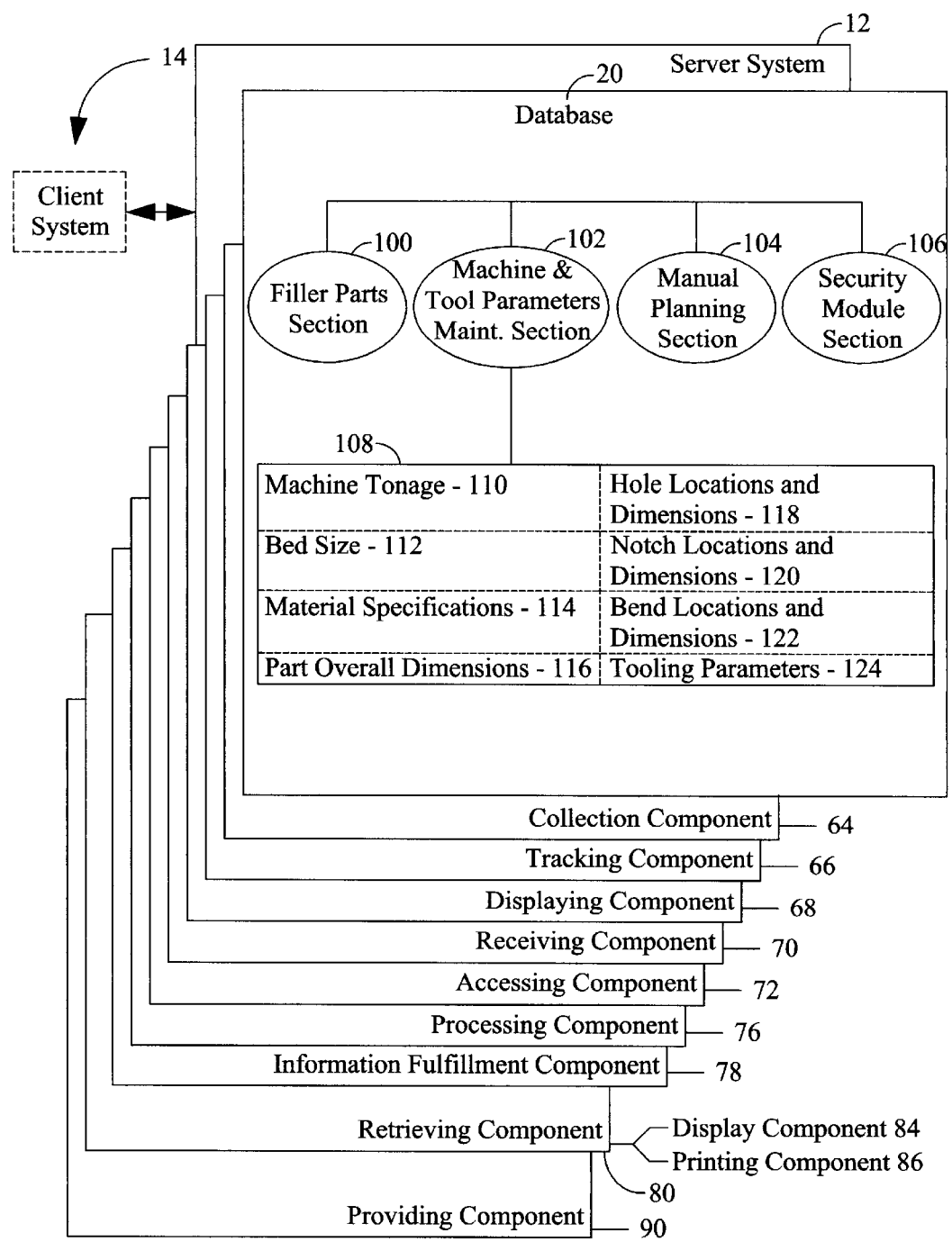
FIG. 2 illustrates an example configuration of a database within the server system including other related server components.

FIG. 2 illustrates an example configuration of database 20 within server system 12 shown in FIG. 1. Database 20 is coupled to several separate computer software components within server system 12 which perform specific tasks. In the example embodiment, server system 12 includes a collection component 64 for collecting data from users in database 20, a tracking component 66 for tracking data, and a displaying component 68 to display information. Tracking component 66 tracks and cross-references data, including modifying existing data.

Server system 12 also includes a receiving component 70 to receive a specific query from remote systems 14, and an accessing component 72 to access database 20. Receiving component 70 is programmed to receive a query from one of a plurality of users. Server system 12 further includes a processing component 76 for searching and processing received queries against database 20 containing a variety of information collected by collection component 64. An information fulfillment component 78, located in server system 12, enables the requested information to be downloaded to the plurality of users in response to the requests received by receiving component 70. Information fulfillment component 78 downloads the information after the information is retrieved from database 20 by a retrieving component 80. Retrieving component 80 retrieves, downloads and sends information to remote system 14 based on a query received from remote system 14.

Retrieving component 80 also includes a display component 84 that is configured to download information to be displayed on a remote system's graphical user interface and a printing component 86 that is configured to print information. Retrieving component 80 generates reports requested by the user through remote system 14 in a predetermined format. System 10 is flexible to provide other alternative types of reports and is not constrained to the options set forth above.

Server system 12 also includes a providing component 90. Providing component 90 electronically provides a report to a manager utilizing a remote system 14 such that the manager may track an efficiency of a machine operator.

In one embodiment, collection component 64, tracking component 66, displaying component 68, receiving component 70, accessing component 72, processing component 76, information fulfillment component 78, retrieving component 80, display component 84, printing component 86, and providing component 90 are computer programs embodied on computer readable medium.

Database 20 is divided into a Filler Parts Section 100, a Machine and Tool Parameters Maintenance Section 102, a Manual Planning Section 104, and a Security Module Section 106.

Filler Parts Section 100 includes data relating to high use components that are utilized by FCCS 10 (shown in FIG. 1) as a component of the optimization process. Filler parts are defined as high use components that can be nested together before sending a corresponding NC code to at least one of a Shear Machine and a Mubea Machine to facilitate material utilization.

Machine and Tool Parameters Maintenance Section 102 includes fabrication data 108. Fabrication data 108 includes at least one of machine tonage 110, bed size 112, material specifications 114, part overall dimensions 116, hole locations and dimensions 118, notch locations and dimensions 120, bend locations and dimensions 122, and tooling parameters 124. Machine and Tool Parameters Maintenance Section 102 enables FCCS 10 to automatically create routing operations for each component by selecting a machine or a sequence of machines that facilitates an efficient fabrication of each component.

Manual Planning Section 104 includes data relating to components that require special dies or other machining processes that are not stored in FCCS 10. Manual Planning Section 104 therefore enables a user to manually plan and input a routing path into FCCS 10 so that a component that requires "special" fabrication processes may be fabricated.

Security Module Section 106 includes security data that prevents unauthorized users from updating machine parameters and order data. System 10 accumulates a variety of confidential data and has different access levels to control and monitor the security of and access to system 10. Authorization for access is assigned by system administrators on a need to know basis. In one embodiment, access is provided based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architectures of system 10 as well as various components of system 10 are example only. Other architectures are possible and can be utilized in connection with practicing the processes described below.

Figure 3:
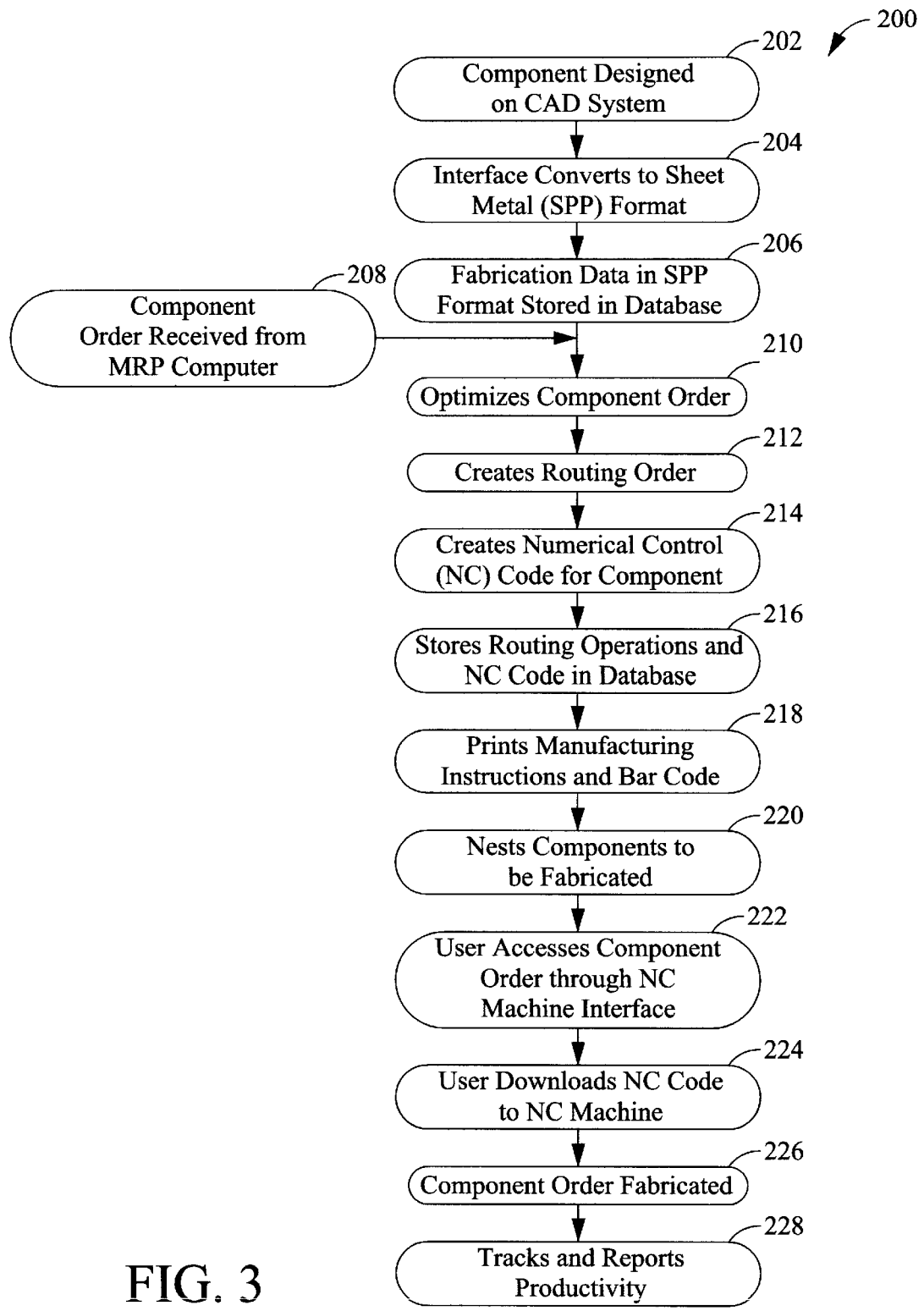
FIG. 3 is a flowchart illustrating example processes utilized by a FCCS.

FIG. 3 is a flowchart 200 illustrating example processes utilized by system 10. The technical effect of FCCS 10 is achieved by first designing 202 a component to be fabricated on CAD computer 16 (shown in FIG. 1). CAD computer 16 generates fabrication data 108 (shown in FIG. 2) for the specific component in a graphical format. CAD computer 16 is in communication with server system 12 (shown in FIG. 1) through interface 22 (shown in FIG. 1), which converts 204 the fabrication data from a graphical format to a sheet metal format. The fabrication data in sheet metal format is then stored 206 in database 20 (shown in FIG. 1) in server system 12. Also in communication with server system 12 is MRP computer 18 (shown in FIG. 1). MRP computer 18 receives 208 an order of components from a user. MRP computer 18 communicates with server system 12 through processor 24 (shown in FIG. 1). Processor 24 optimizes 210 the fabrication of the ordered components by evaluating the fabrication data and the specific machines needed to fabricate each ordered component. Processor 24 then creates 212 routing operations based on the optimization process and creates 214 a Numerical Control (NC) code for fabricating each ordered component. The routing operations and the NC code are then stored 216 in database 20. System 10 then prints 218 manufacturing instructions and a bar code for each ordered component.

Server system 12 utilizes scheduler/controller 26 (shown in FIG. 1) to nest 220 components on a length of raw copper, aluminum, or other raw material to improve material utilization, and creates an NC code for the nested components. A user then accesses 222 a component order through NC Machine interface 28 (shown in FIG. 1), scans the bar code assigned to a specific component or nested components from the manufacturing instructions, and downloads 224 the NC code for the components to an NC machine 30 (shown in FIG. 1) so that the components may be fabricated 226. System 10 then tracks and reports 228 the productivity of each employee with respect to the fabrication of each component.

Figure 4:
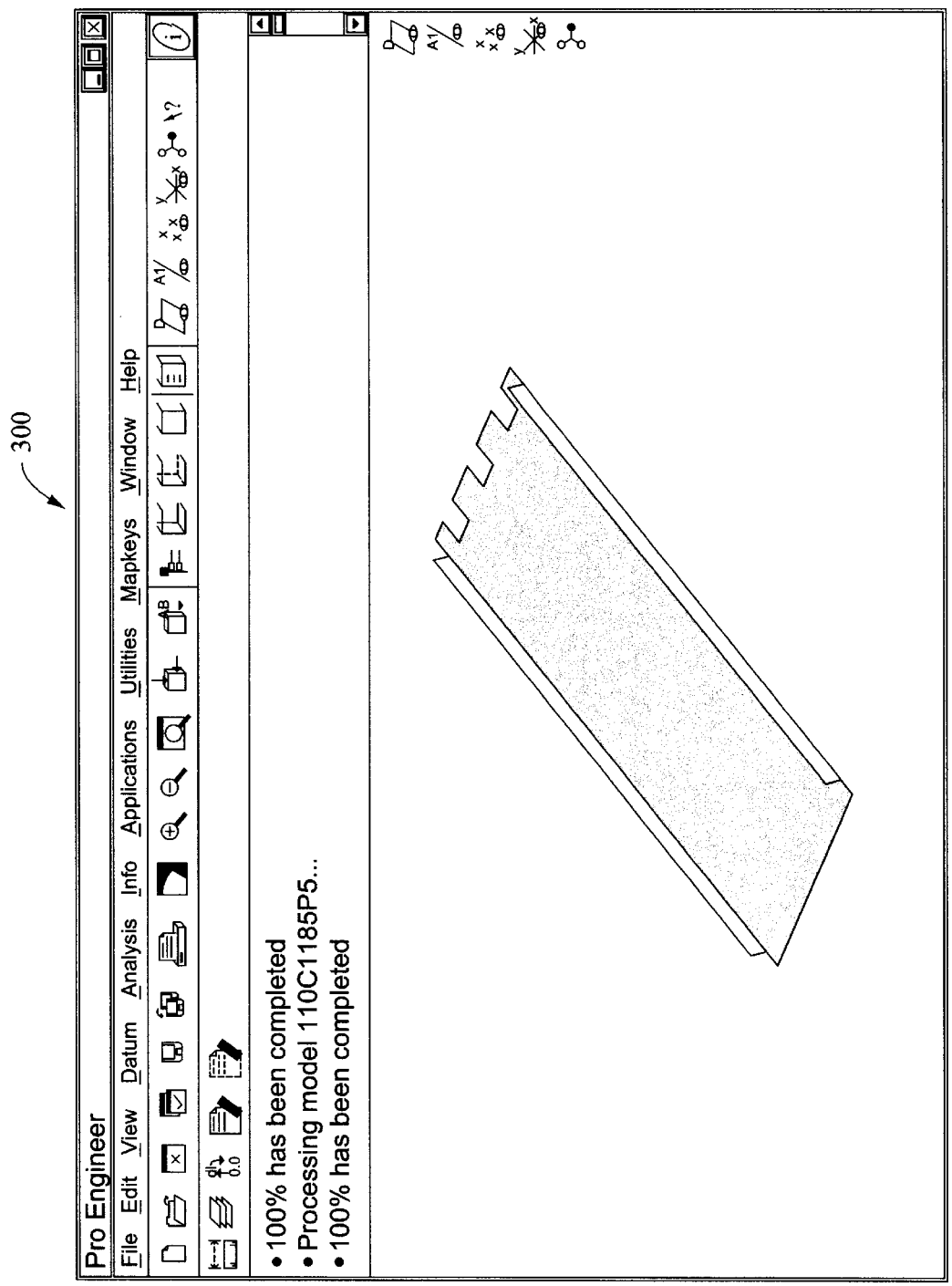
FIG. 4 is an example embodiment of a user interface displaying a component to be fabricated as shown in a CAD computer within a FCCS.

FIG. 4 is an example embodiment of a user interface 300 displaying a component to be fabricated as shown in CAD computer 16 (shown in FIG. 1). In the example embodiment, CAD computer 16 includes a known and commercially available CAD computer program, for example, CAD computer 16 may include a ProEngineer® CAD System from Parametric Technology Corporation, Needham, Mass. (Pro/Engineer is a registered trademark of Parametric Technology Corporation, Needham, Mass.) or a Calma(Graphics System from Calma Company, Santa Clara, Calif. (Calma is a registered trademark of Calma Company, Santa Clara, Calif.).

CAD computer 16 generates fabrication data 108 (shown in FIG. 2) for the specific component in a graphical format. CAD computer 16 is in communication with server system 12 (shown in FIG. 1) through interface 22 (shown in FIG. 1) such that fabrication data 108 in graphical format is communicated to interface 22. Interface 22 includes a known and commercially available computer software, for example, interface 22 may include computer software sold by Jerand Technical Service, Inc., Indianapolis, Ind. Interface 22 converts fabrication data 108 from a graphical format to a sheet metal (SPP) format.

Figure 5:
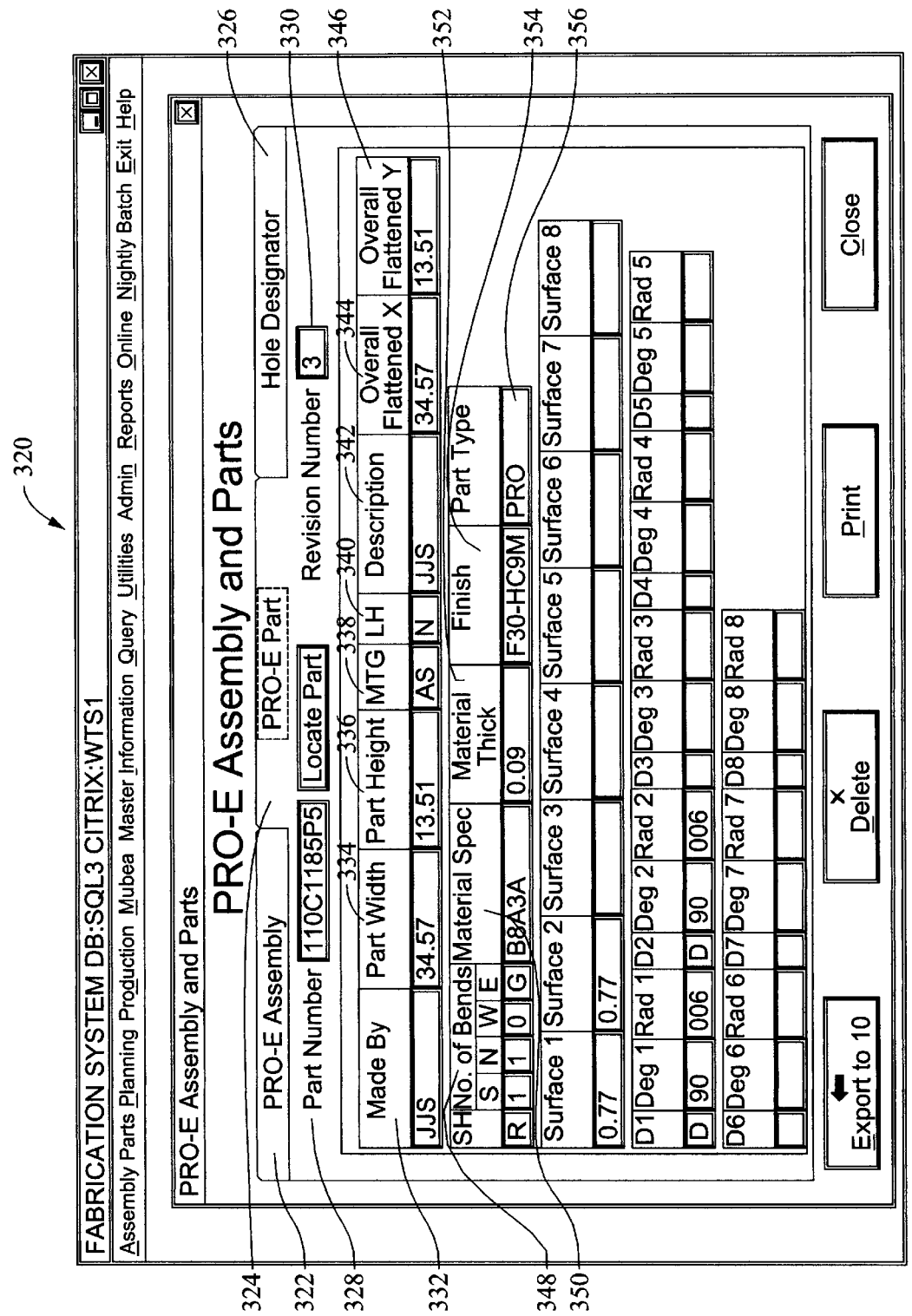
FIG. 5 is an example embodiment of a user interface displaying a Pro-E Assembly and Parts page within a FCCS.

FIG. 5 is an example embodiment of a user interface 320 that displays a Pro-E Assembly and Parts page generated by interface 22 (shown in FIG. 1) within system 10 (shown in FIG. 1). System 10 includes interface 22 that communicates with CAD computers 16 (shown in FIG. 1) and database 20 (shown in FIG. 1). In the example embodiment, interface 22 converts fabrication data 108 (shown in FIG. 2) in graphical format from CAD computers 16 to a sheet metal (SPP) format which is then stored in database 20. User interface 320 displays fabrication data 108 for a selected component to be fabricated that has been converted by interface 22 into sheet metal format.

User interface 320 includes a Pro-E Assembly tab 322, a Pro-E Part tab 324, and a Hole Designator tab 326. User interface 320 displays a screen after Pro-E tab 324 has been selected.

User interface 320 also displays a Part Number data field 328, a Revision Number data field 330, a Made By data field 332, a Part Width data field 334, a Part Height data field 336, an MTG data field 338, an LH data field 340, a Description data field 342, an Overall Flattened X data field 344, and an Overall Flattened Y data field 346. User interface 320 also displays a Number of Bends data field 348, a Material Specification data field 350, a Material Thickness data field 352, a Finish data field 354, and a Part Type data field 356. User interface 320 displays the physical characteristics of each component to be fabricated such that the component may be fabricated.

Figure 6:
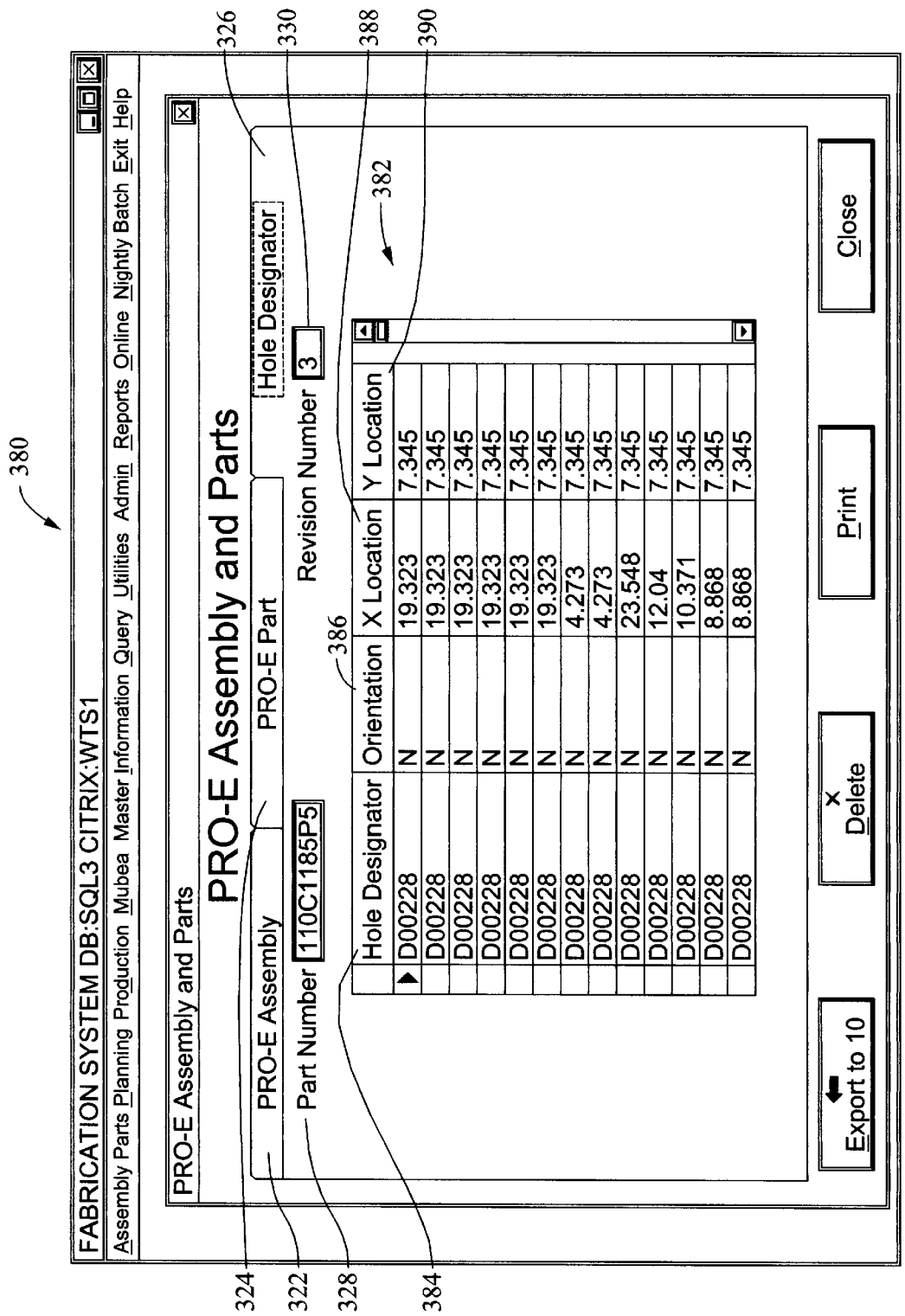
FIG. 6 is an another example embodiment of a user interface displaying a Pro-E Assembly and Parts page within a FCCS.

FIG. 6 is an example embodiment of a user interface 380 that displays another Pro-E Assembly and Parts page generated by interface 22 (shown in FIG. 1) within system 10 (shown in FIG. 1). Components in user interface 380, identical to components of user interface 320 (shown in FIG. 5), are identified in FIG. 6 using the same reference numerals as used in FIG. 5. User interface 380 displays a screen after Hole Designator 326 has been selected.

User interface 380 displays a Part Number data field 328, and a Revision Number data field 330. User interface 380 also displays a chart 382 displaying hole locations for each hole to be fabricated within a selected component. Chart 382 includes a Hole Designator column 384, an Orientation column 386, an X Location column 388, and a Y Location column 390.

Figure 7:
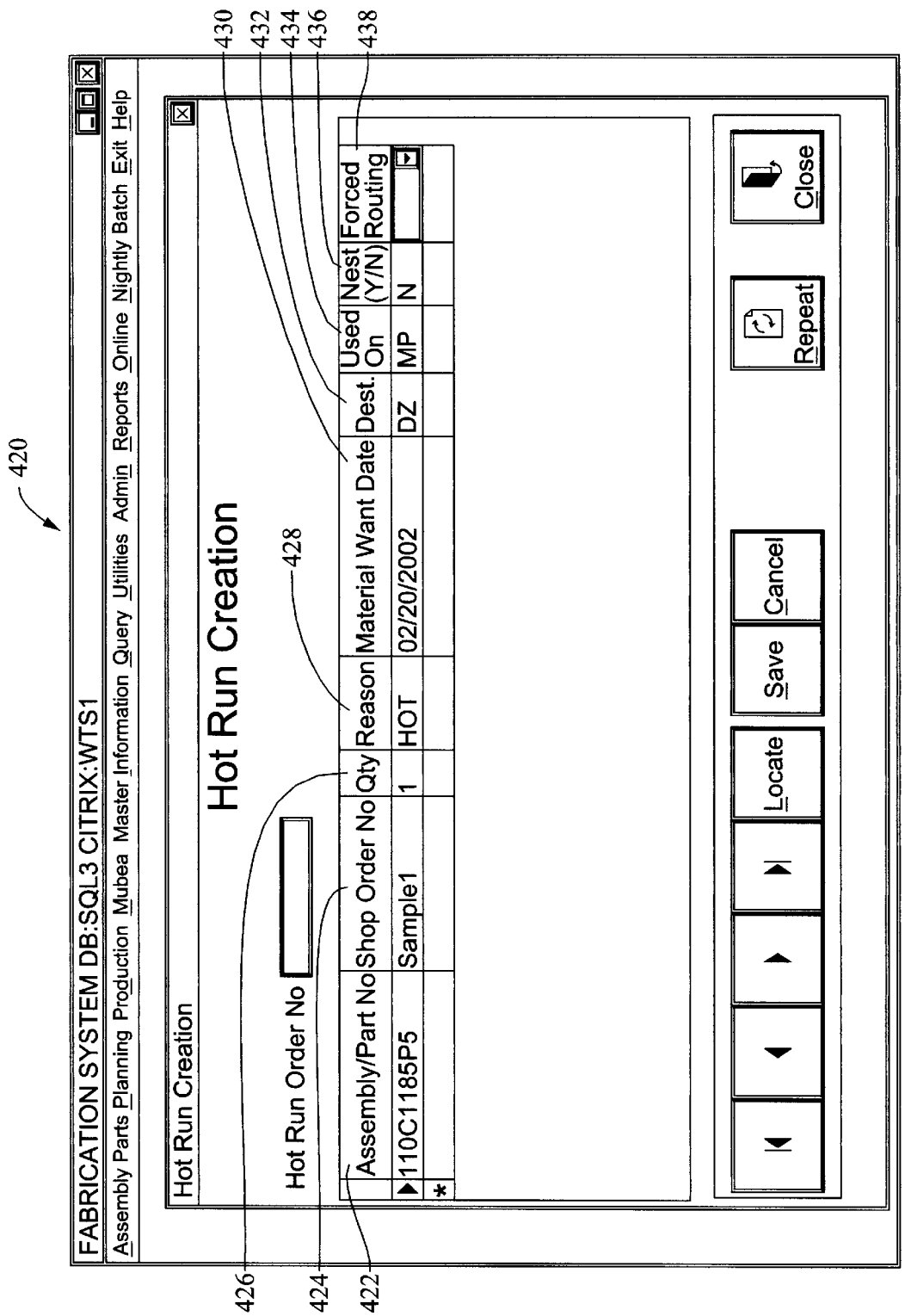
FIG. 7 is an example embodiment of a user interface displaying a Creation page from an Order Processor and NC Code generator module within a FCCS.

FIG. 7 is an example embodiment of a user interface 420 displaying a Creation page from Order Processor and NC Code generator module 24 (shown in FIG. 1). Processor 24 is in communication with server system 12 (shown in FIG.

1). Processor 24 receives an order of components from a user. Processor 24 communicates with server system 12.

User interface 420 displays a page wherein a user inputs data to request that a specific component or components be fabricated by system 10. User interface 420 includes an Assembly/Part No. data field 422, a Shop Order No. data field 424, a Quantity data field 426, a Reason data field 428, a Material Want Date data field 430, a Destination data field 432, a Used On data field, 434, a Nest data field 436, and a Forced Routing data field 438.

A user has at least one selectable option when submitting a Hot Run order through processor 24. The destination code specifies whether the component should be routed to the sheet metal machines (i.e., DZ), the manual Bus Bar machines (i.e., DB), or the Automated Mubea Bus Bar machines (i.e., DM). The first character of the two character Used On code specifies which Product Line the component will be used on (i.e., M=Motor Control, L=Limtamp, and S=Switchboard). The second character specifies whether the component is a special make to order (i.e., P), stock part (i.e., T), or Kanban part (i.e., K). The user can also specify to which single part punch turret machine the component should be Force Routed. If the Force Routing field is left blank, the system will select the single part punch turret best suited to fabricate the component being ordered. If the component is too small to be clamped by the single part punch turret machine, or if the user wishes to group several components together on a single piece of sheet metal, the nesting option can be selected. The user can also specify to nest (N) the components on a standard 48"×48" sheet, or to have the component(s) nested on a variable size sheet (V). This allows a small component to be nested on a sheet as small as 12"×12" minimizing the amount of scrap generated.

Figure 8:
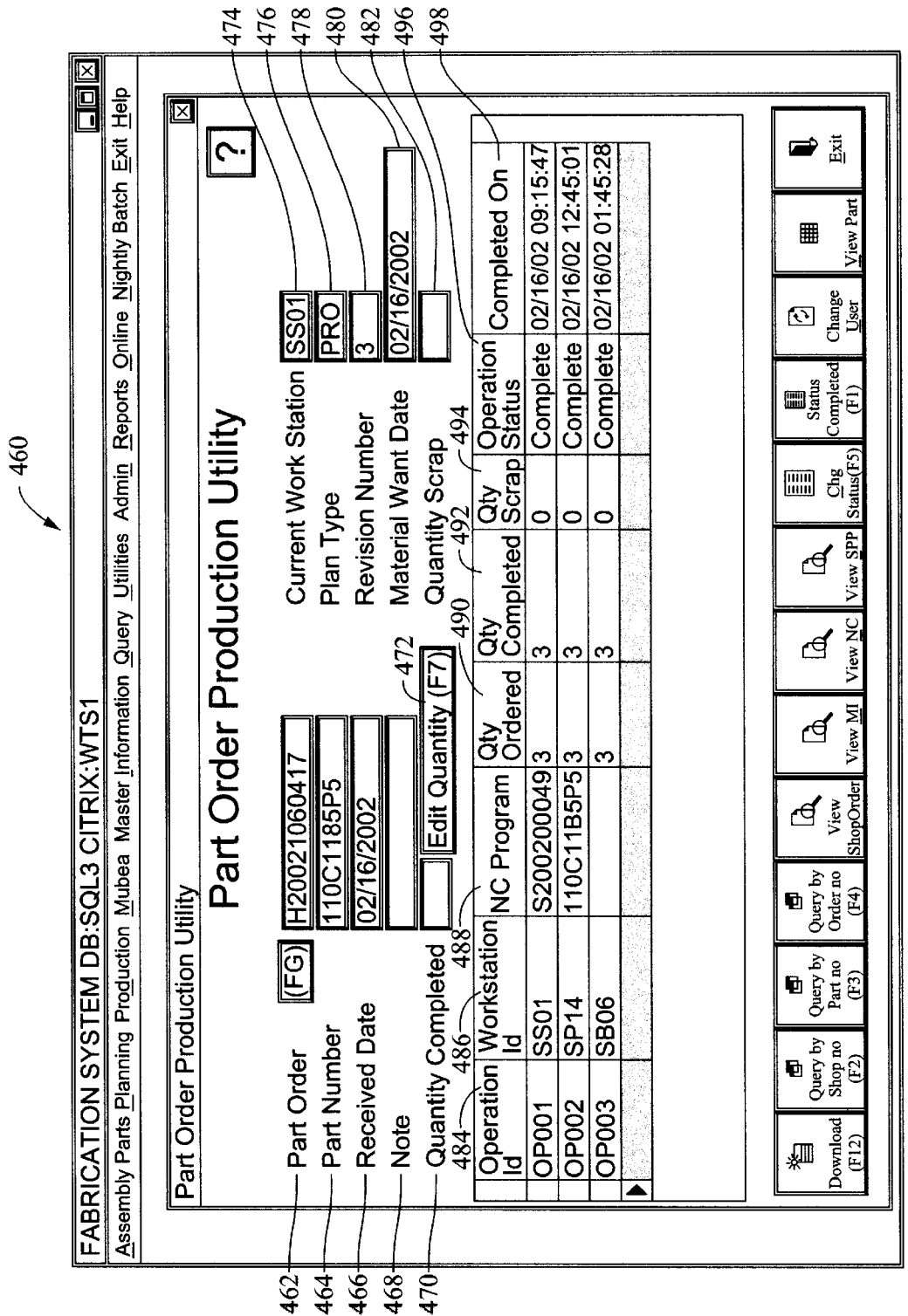
FIG. 8 is an example embodiment of a user interface displaying a Part Order Production Utility page within a FCCS.

FIG. 8 is an example embodiment of a user interface 460 displaying a Part Order Production Utility page on MRP computer 18 (shown in FIG. 1). MRP computer 18 is in communication with server system 12 (shown in FIG. 1). MRP computer 18 receives an order of components from a user. MRP computer 18 communicates with server system 12 through processor 24 (shown in FIG. 1), which is in communication with database 20 (shown in FIG. 1).

User interface 460 displays a page that enables a user to track and edit components that have been ordered for fabrication on system 10. User interface 460 displays a Part Order data field 462, a Part Number data field 464, a Received Date data field 466, a Note data field 468, a Quantity Completed data field 470, an Edit Quantity button 472, a Current Work Station data field 474, a Plan Type data field 476, a Revision Number 478, a Material Want Date data field 480, and a Quantity Scrap data field 482.

User interface 460 also displays a chart including an Operation ID column 484, a Workstation ID column 486, an NC Program 488, a Quantity Ordered column 490, a Quantity Completed column 492, a Quantity Scrap column 494, an Operation Status column 496, and a Completed On column 498.

Figure 9:
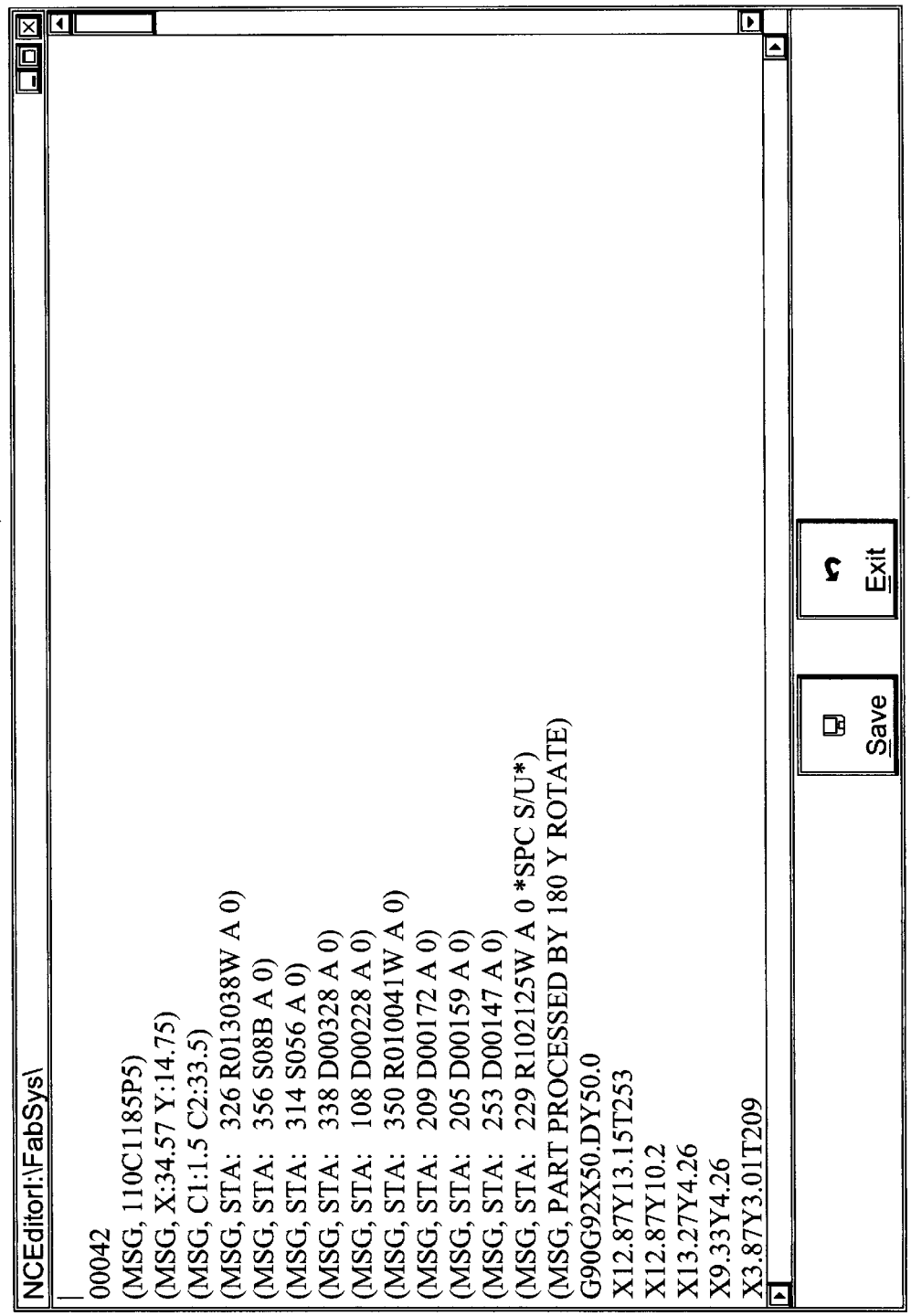
FIG. 9 is an example embodiment of a user interface displaying a Numerical Control code page within a FCCS.

FIG. 9 is an example embodiment of a user interface 520 displaying an NC Code page on NC Machine Interface 28 (shown in FIG. 1). NC Machine Interface 28 enables a user to access a component order and view user interface 520. The user can then download the NC code for the components to be fabricated to NC machines 30. NC machines 30 then fabricate the requested components.

Figure 10:
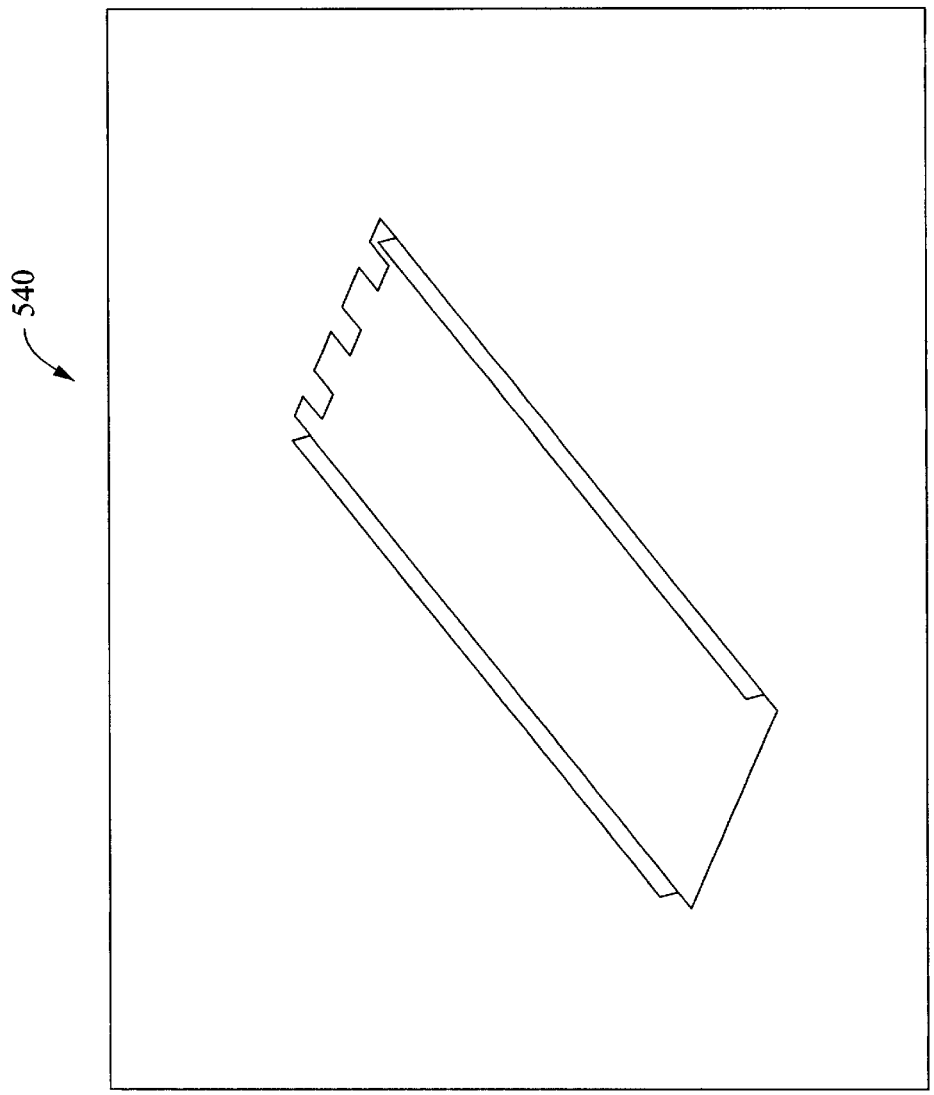
FIG. 10 is an example embodiment of a user interface displaying a 3D Model page within a FCCS.

FIG. 10 is an example embodiment of a user interface 540 displaying a 3D Model page on NC Machine Interface 28 (shown in FIG. 1). NC Machine Interface 28 enables a user to view each component to be fabricated on a 3D viewer as shown in user interface 540 prior to fabrication.

FIG. 11 is an example embodiment of a user interface 560 displaying Manufacturing Instructions and a Bar Code for a specific component on NC Machine Interface 28 (shown in FIG. 1). Processor 24 (shown in FIG. 1) creates routing operations based on an optimization process and creates NC code for fabricating each ordered component. The routing operations and the NC code are stored in database 20 (shown in FIG. 1). System 10 also creates and prints manufacturing instructions 562 and a bar code 564 for each ordered component. Manufacturing instructions 562 and bar code 564 for a specific component are shown in user interface 560. Manufacturing instructions 562 and bar code 564 enable a user to download NC code for the requested components to NC machines 30 by scanning bar code 564. NC machines 30 can then fabricate the requested components.

Figure 12:
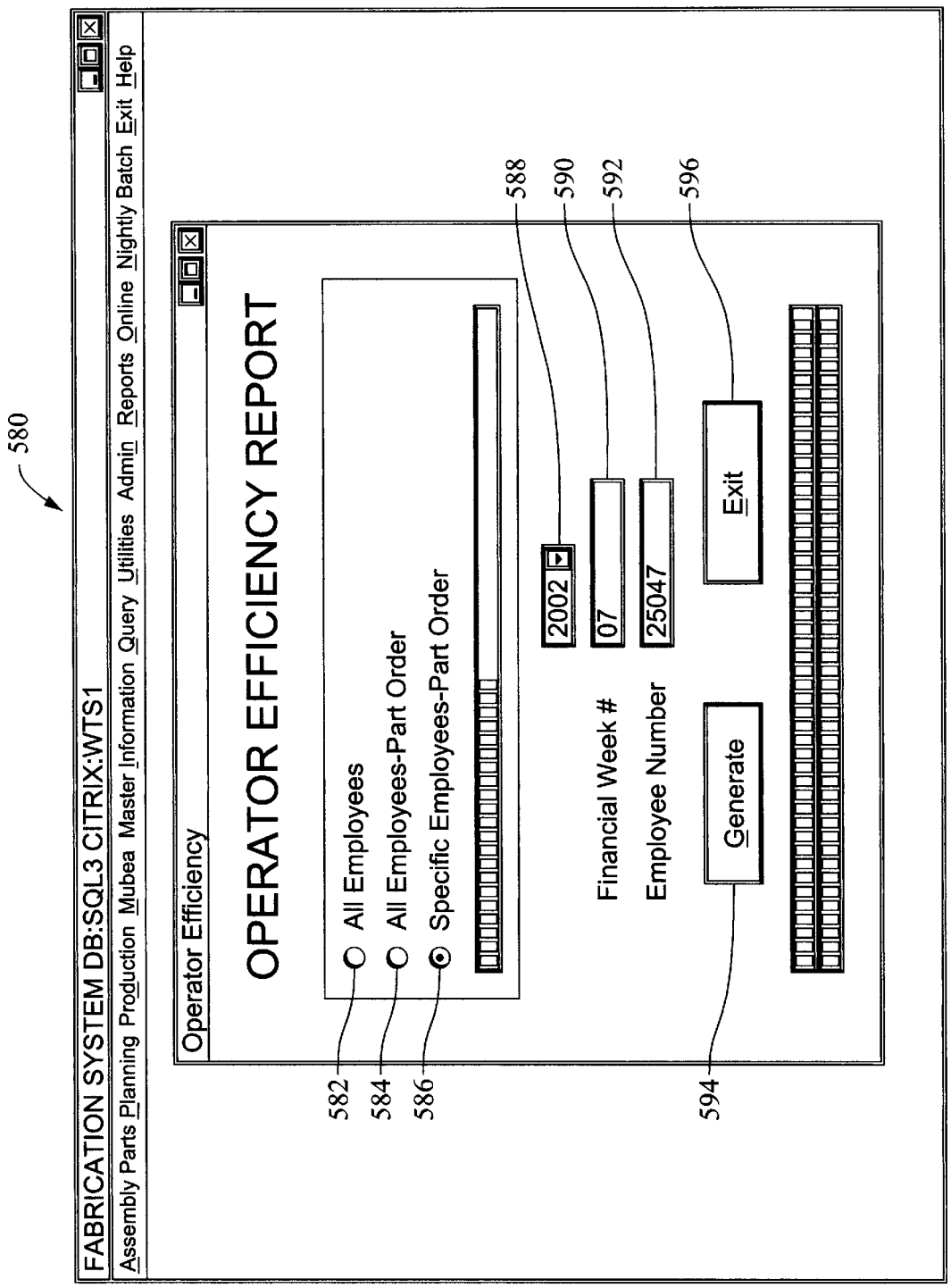
FIG. 12 is an example embodiment of a user interface displaying an Operator Efficiency Report Generation page within a FCCS.

FIG. 12 is an example embodiment of a user interface 580 displaying an Operator Efficiency Report Generation page on system 10 (shown in FIG. 1). System 10 enables a user, in the example embodiment, a manager, to track and generate a report displaying the productivity of each employee, or all employees, with respect to the fabrication of components. The productivity of an employee may include at least one of a machine setup time, a run time per component, a quantity of components fabricated, and a total machine run time. User interface 580 displays an Operator Efficiency Report Generation page for a specific employee. User interface 580 includes an All Employees radio button 582, an All Employees Part Order radio button 584, a Specific Employee Part Order 586, a Year pull down field 588, a Financial Week Number data field 590, an Employee Badge Number data field 592, a Generate button 594, and an Exit button 596.

FIGS. 13A and 13B illustrate an example embodiment of an Operator Efficiency Report page 620 that is generated after a manager enters the requested information on user interface 580 (shown in FIG. 12) and selects Generate button 594 (shown in FIG. 12).

FCCS 10 therefore enables a entity engaged in the fabrication of components to convert fabrication data from a graphical format to a sheet metal format (SPP), store the sheet metal formatted fabrication data in a database, receive an order of components from a user, optimize the fabrication of the ordered components by evaluating the sheet metal formatted fabrication data and the specific machines needed to fabricate each component, create routing operations based on the optimization process, create a Numerical Control (NC) code for fabricating each component, print manufacturing instructions and a bar code for each component, and download the NC code for each component to at least one NC machine such that each component may then be fabricated by the NC machine as set forth in the routing operations. FCCS 10 also enables a user to track and report productivity of each employee with respect to the fabrication of each component. By automating the fabrication process of machine components, FCCS 10 facilitates reducing the amount of time spent on laying out each component and setting up the machines to fabricate each component, facilitates reducing variations in each component, and optimizes the fabrication of each component by reducing scrap material and selecting an efficient machine routing path.

While the invention has been described in terms of various specific embodiments, those skilled in the art will recognize that the invention can be practiced with modification within the spirit and scope of the claims.

What is claimed is:

1. A method for fabricating at least one component using a server system coupled to a centralized database and at least one client system, said method comprising:
receiving fabrication data for at least one component from the system;
receiving a component order from the client system;
storing fabrication data and component order data in the centralized database;
creating routing operations based on an evaluation of specific machines used to fabricate each ordered component;
creating Numerical Control (NC) code for fabricating each ordered component; and
fabricating each ordered component.

2. A method in accordance with claim 1 further comprising tracking the fabrication of each ordered component.

3. A method in accordance with claim 2 wherein tracking the fabrication of each ordered component comprises:
tracking a productivity of each user involved in the fabrication of at least one component; and
generating a report displaying the productivity of each user.

4. A method in accordance with claim 1 wherein creating routing operations based on an evaluation of specific machines used to fabricate each ordered component comprises optimizing the fabrication of each ordered component by:
nesting components to be fabricated on a piece of sheet metal; and
creating routing operations for fabricating the nested components based on fabrication data and at least one NC machine utilized in the fabrication of the nested components.

5. A method in accordance with claim 1 wherein receiving fabrication data comprises receiving fabrication data for each component to be fabricated from a client system that is in communication with the server system through an interface.

6. A method in accordance with claim 5 wherein receiving fabrication data comprises receiving fabrication data for each component to be fabricated from the client system wherein the interface converts the fabrication data from a graphical format to a sheet metal format.

7. A method in accordance with claim 1 wherein receiving a component order comprises receiving a component order from the client system wherein the client system is a material requirement planning computer that is in communication with the server system.

8. A method in accordance with claim 1 wherein storing fabrication data in the centralized database comprises;
converting fabrication data for each component to be fabricated from a graphical format to a sheet metal format; and
storing fabrication data in sheet metal format for each component to be fabricated in the centralized database.

9. A method in accordance with claim 1 wherein fabricating each ordered component comprises transmitting routing operations and NC code to at least one NC machine for fabricating each ordered component.

10. A method in accordance with claim 9 wherein transmitting routing operations and NC code to at least one NC machine comprises:
creating manufacturing instructions for fabricating each ordered component;
creating a bar code that includes the NC code for fabricating each ordered component; and
printing the manufacturing instructions and the bar code for each ordered component such that a user scans the bar code to download the NC code to an NC machine that fabricates each ordered component.

11. A method in accordance with claim 9 wherein transmitting routing operations and NC code to at least one NC machine further comprises transmitting routing operations and NC code to at least one NC machine that fabricates the ordered components wherein the NC machine includes at least one of a Shear Machine, a Turret Machine, a Punch Press Machine, a Brake Machine, a Drill & Tap Machine, a Weld Machine, and a Paint/Plate Machine.

12. A method in accordance with claim 1 further comprising connecting the client system and the server system via a network that includes one of a wide area network, a local area network, an intranet and the Internet.

13. A method for fabricating at least one component using a server system coupled to a centralized database and at least one client system, said method comprising:
receiving fabrication data for at least one component from a client system;
receiving a component order from the client system;
storing fabrication data and component order data in the centralized database;
creating routing operations for fabricating each ordered component, wherein creating routing operations for fabricating each ordered component comprises optimizing the fabrication of each ordered component by creating routing operations based on fabrication data received at the server system and at least one NC machine utilized in the fabrication of each ordered component;
creating Numerical Control (NC) code for fabricating each ordered component; and
fabricating each ordered component.

14. A method for fabricating at least one component using a server system coupled to a centralized database and at least one client system, said method comprising:
receiving fabrication data for each component to be fabricated from a client system wherein the fabrication data is in a graphical format and the client system is a computer aided design computer system;
receiving a component order from the client system;
storing the fabrication data and component order data in the centralized database;
creating routing operations for fabricating each ordered component;
creating Numerical Control (NC) code for fabricating each ordered component; and
fabricating each ordered component.

15. A method for fabricating at least one component using a server system coupled to a centralized database and at least one client system, said method comprising:
receiving fabrication data for at least one component from a client system;
receiving a component order from a client system;
storing fabrication data in a graphical format for each component to be fabricated in the centralized database;
creating routing operations for fabricating each ordered component;
creating Numerical Control (NC) code for fabricating each ordered component; and
fabricating each ordered component.

16. A network based system for fabricating at least one component, said system comprising:
- a client system;
- a centralized database for storing information;
- a server system configured to be coupled to said client system and said database, said server system further configured to:
  - receive fabrication data for at least one component from said client system;
  - receive a component order from said client system;
  - store the fabrication data and said component order in said centralized database;
  - create routing operations based on an evaluation of specific machines used to fabricate each ordered component;
  - create Numerical Control (NC) code for fabricating each ordered component; and
  - fabricate each ordered component.

17. A system in accordance with claim 16 wherein said server system is further configured to track the fabrication of each ordered component.

18. A system in accordance with claim 17 wherein said server system further comprises a tracking component for:
- tracking a productivity of each user involved in the fabrication of at least one component; and
- generating a report displaying the productivity of each user.

19. A system in accordance with claim 16 wherein said client system further comprises at least one of:
- a displaying component for displaying at least one of a pull-down list, a check box, and hypertext link options relating to fabrication data;
- a sending component to send an inquiry to said server system so that said server system can process and download the requested data to said client system;
- a collection component for collecting fabrication data from users into said centralized database;
- a tracking component for tracking fabrication data;
- a displaying component for displaying fabrication data for at least one component;
- a receiving component for receiving an inquiry from said client system regarding fabrication data;
- an accessing component for accessing said centralized database and causing the retrieved data to be displayed on said client system; and
- a tracking component for tracking productivity of each user involved in fabricating components.

20. A system in accordance with claim 16 wherein said server system further comprises a processing component for optimizing the fabrication of each ordered component by:
- nesting components to be fabricated on a piece of sheet metal; and
- creating routing operations for fabricating said nested components based on fabrication data and at least one NC machine utilized in the fabrication of said nested components.

21. A system in accordance with claim 16 wherein said client system is in communication with said server system through an interface.

22. A system in accordance with claim 21 wherein said interface converts said fabrication data from a graphical format to a sheet metal format.

23. A system in accordance with claim 16 wherein said collection component is configured to:
- convert the fabrication data for each component to be fabricated from a graphical format to a sheet metal format; and
- store the fabrication data in sheet metal format for each component to be fabricated in said centralized database.

24. A system in accordance with claim 16 wherein said server system further comprises a processing component for creating routing operations for fabricating each ordered component.

25. A system in accordance with claim 16 wherein said server system further comprises an information fulfillment component for:
- creating manufacturing instructions for fabricating ordered components;
- creating a bar code that includes the NC code for fabricating each ordered component; and
- printing the manufacturing instructions and the bar code for each ordered component wherein a user scans the bar code to download the NC code to an NC machine that fabricates each ordered component.

26. A system in accordance with claim 16 wherein said server system further comprises an information fulfillment component for transmitting routing operations and NC code to at least one NC machine that fabricates each ordered component wherein the NC machine includes at least one of a Shear Machine, a Turret Machine, a Punch Press Machine, a Brake Machine, a Drill & Tap Machine, a Weld Machine, and a Paint/Plate Machine.

27. A system in accordance with claim 16 wherein said client system further comprises at least one of a computer aided design computer and a material requirement planning computer.

28. A network based system for fabricating at least one component, said system comprising:
- a client system;
- a centralized database for storing information;
- a server system configured to be coupled to said client system and said centralized database, said server system further configured to:
  - receive fabrication data for at least one component from a client system;
  - receive a component order from said client system;
  - store fabrication data and said component order in said centralized database;
  - create routing operations for fabricating each ordered component based on said fabrication data received and at least one NC machine utilized in the fabrication of each ordered component;
  - create Numerical Control (NC) code for fabricating each ordered component; and
  - fabricate each ordered component.

29. A network based system for fabricating at least one component, said system comprising:
- a client system;
- a centralized database for storing information;
- a server system configured to be coupled to said client system and said centralized database, said server system further configured to:
  - receive fabrication data for at least one component to be fabricated wherein said fabrication data is in a graphical format;
  - receive a component order from said client system;

store fabrication data and said component order in said centralized database;

create routing operations for fabricating each ordered component;

create Numerical Control (NC) code for fabricating each ordered component: and fabricate each ordered component.

30. A network based system for fabricating at least one component, said system comprising:

a client system;

a centralized database for storing information;

a server system configured to be coupled to said client system and said centralized database, said server system further configured to:

receive fabrication data for at least one component from said client system;

receive a component order from said client system;

store said component order in said centralized database;

create routing operations for fabricating each ordered component;

create Numerical Control (NC) code for fabricating each ordered component; and fabricate each ordered component; said server system including a collection component for collecting and storing said fabrication data in said centralized database wherein said fabrication data is in a graphical format.

31. A network based system for fabricating at least one component, said system comprising:

a client system;

a centralized database for storing information;

a server system configured to be coupled to said client system and said centralized database, said server system further configured to:

receive fabrication data for at least one component from said client system;

receive a component order from said client system;

store fabrication data and said component order in said centralized database;

create routing operations for fabricating each ordered component;

create Numerical Control (NC) code for fabricating each ordered component; and fabricate each ordered component; and an information fulfillment component for transmitting the routing operations and the NC code to at least one NC machine for fabricating each ordered component.

32. A computer program embodied on a computer readable medium for fabricating at least one component, said program comprising a code segment that receives fabrication data and then:

receives a component order from a client system;

stores fabrication data and component order data in a centralized database;

creates routing operations based on an evaluation of specific machines used to fabricate each ordered component;

creates Numerical Control (NC) code for fabricating each ordered component;

transmits routing operations and NC code to at least one NC machine for fabricating each ordered component; and tracks the fabrication of each ordered component.

33. A computer program in accordance with claim 32 further comprising a code segment that optimizes the fabrication of each ordered component by:

nesting components to be fabricated on a piece of sheet metal; and creating routing operations for fabricating the nested components based on fabrication data and the at least one NC machine utilized in the fabrication said nested components.

34. A computer program in accordance with claim 32 further comprising a code segment that receives fabrication data for each component to be fabricated from a client system through an interface.

35. A computer program in accordance with claim 34 further comprising a code segment that receives fabrication data for each component to be fabricated from a client system such that said interface converts said fabrication data from a graphical format to a sheet metal format.

36. A computer program in accordance with claim 32 further comprising a code segment that:

converts the fabrication data for each component to be fabricated from a graphical format to a sheet metal format; and stores the fabrication data in sheet metal format for each component to be fabricated in a centralized database.

37. A computer program in accordance with claim 32 further comprising a code segment that:

creates manufacturing instructions for fabricating ordered components;

creates a bar code that includes the NC code for fabricating each ordered component; and prints the manufacturing instructions and the bar code for each ordered component wherein a user scans the bar code to download the NC code to an NC machine that fabricates each ordered component.

38. A computer program in accordance with claim 32 further comprising a code segment that transmits routing operations and NC code to at least one NC machine that fabricates each ordered component wherein the NC machine includes at least one of a Shear Machine, a Turret Machine, a Punch Press Machine, a Brake Machine, a Drill & Tap Machine, a Weld Machine, and a Paint/Plate Machine.

39. A computer program in accordance with claim 32 further comprising a code segment that:

tracks a productivity of each user involved in the fabrication of at least one component; and generates a report displaying the productivity of each user.

40. A computer program in accordance with claim 32 further comprising a code segment that monitors security of a system including the computer program by restricting access to authorized individuals.

41. A computer program embodied on a computer readable medium for fabricating at least one component, said program comprising a code segment that receives fabrication data and then:

receives a component order from a client system;

stores fabrication data and component order data in a centralized database;

creates routing operations for fabricating each ordered component based on fabrication data received and the at least one NC machine utilized in the fabrication of each ordered component;

creates Numerical Control (NC) code for fabricating each ordered component;

transmits routing operations and NC code to at least one NC machine for fabricating each ordered component; and tracks the fabrication of each ordered component.

42. A computer program embodied on a computer readable medium for fabricating at least one component, said program comprising a code segment that receives fabrication data and then:

receives a component order from a client system;

receives fabrication data for each component to be fabricated wherein said fabrication data is in a graphical format;

stores the fabrication data and component order data in a centralized database;

creates routing operations for fabricating each ordered component;

creates Numerical Control (NC) code for fabricating each ordered component;

transmits routing operations and NC code to at least one NC machine for fabricating each ordered component; and tracks the fabrication of each ordered component.

43. A computer program embodied on a computer readable medium for fabricating at least one component, said program comprising a code segment that receives fabrication data and then:

receives a component order from a client system;

stores component order data in a centralized database;

collects and stores fabrication data in the centralized database wherein said fabrication data is in a graphical format, creates routing operations for fabricating each ordered component;

creates Numerical Control (NC) code for fabricating each ordered component;

transmits routing operations and NC code to at least one NC machine for fabricating each ordered component; and tracks the fabrication of each ordered component.

* * * * *

UNITED STATES PATENT AND TRADEMARK OFFICE
CERTIFICATE OF CORRECTION

PATENT NO. : 6,785,581 B2
APPLICATION NO. : 10/139883
DATED : August 31, 2004
INVENTOR(S) : Mountcastle, III et al.

It is certified that error appears in the above-identified patent and that said Letters Patent is hereby corrected as shown below:

Column 11, line 6, between "the" and "system" insert -- client --.

Column 11, line 52, delete "comprises;" and insert therefor -- comprises: --.

Column 15, line 6, delete "component:" and insert therefor -- component; --.

Signed and Sealed this

Twenty-fifth Day of December, 2007

JON W. DUDAS
*Director of the United States Patent and Trademark Office*